(12) United States Patent
Schwafertz et al.

(10) Patent No.: US 8,117,887 B2
(45) Date of Patent: Feb. 21, 2012

(54) OPERATING DEVICE FOR TESTING TORQUE WRENCHES

(75) Inventors: Rainer Schwafertz, Remscheid (DE); Lothar Schmitt, Wuppertal (DE)

(73) Assignee: Eduard Wille GmbH & Co. KG, Wuppertal (DE)

( * ) Notice: Subject to any disclaimer, the term of this patent is extended or adjusted under 35 U.S.C. 154(b) by 407 days.

(21) Appl. No.: 12/380,517

(22) Filed: Feb. 27, 2009

(65) Prior Publication Data

US 2009/0217773 A1   Sep. 3, 2009

(30) Foreign Application Priority Data

Feb. 29, 2008   (DE) .................. 20 2008 002 919

(51) Int. Cl.
*G01L 25/00* (2006.01)

(52) U.S. Cl. ............ 73/1.12; 73/1.01; 73/1.08; 73/1.09; 73/1.11

(58) Field of Classification Search .................... 73/1.01, 73/1.08, 1.11, 1.12
See application file for complete search history.

(56) References Cited

U.S. PATENT DOCUMENTS

| | | | | | |
|---|---|---|---|---|---|
| 2,411,931 A | * | 12/1946 | McVey | ............................ | 73/1.12 |
| 2,691,295 A | * | 10/1954 | Zeiger | ............................ | 73/1.12 |
| 2,955,454 A | * | 10/1960 | Husher | ........................... | 73/1.11 |
| 3,011,332 A | * | 12/1961 | Skidmore | ...................... | 73/1.09 |
| 3,187,550 A | * | 6/1965 | Bratton | .......................... | 73/1.12 |
| 3,274,827 A | * | 9/1966 | Sturtevant | .................. | 73/862.23 |
| 3,364,725 A | * | 1/1968 | Bosko | ............................ | 73/1.12 |
| 3,456,485 A | * | 7/1969 | Larson | ........................... | 73/1.12 |
| 3,456,486 A | * | 7/1969 | Kross | ............................ | 73/1.12 |
| 3,675,464 A | * | 7/1972 | Larson | ........................... | 73/1.12 |
| 3,796,334 A | * | 3/1974 | Torrey | .......................... | 414/662 |
| 3,839,905 A | * | 10/1974 | McCallen | ....................... | 73/848 |
| 4,171,647 A | * | 10/1979 | Herrgen | ......................... | 73/854 |
| 4,322,965 A | * | 4/1982 | Bickford | ....................... | 73/1.12 |
| 4,470,312 A | * | 9/1984 | Thompson | .................. | 73/862.08 |
| 4,517,821 A | * | 5/1985 | Taggart et al. | ................. | 73/1.11 |
| 4,761,989 A | * | 8/1988 | McDevitt | ....................... | 73/1.12 |
| 4,852,386 A | * | 8/1989 | Grabovac et al. | ............. | 73/1.09 |
| 5,099,678 A | * | 3/1992 | Grabovac et al. | ............. | 73/1.11 |
| 5,181,425 A | * | 1/1993 | Livingston | ................. | 73/862.08 |
| 5,353,654 A | * | 10/1994 | Lin | ............................... | 73/865.9 |
| 5,703,277 A | * | 12/1997 | Grabovac | ....................... | 73/1.12 |
| 5,734,113 A | * | 3/1998 | Vogt et al. | .................... | 73/862.23 |
| 5,886,246 A | * | 3/1999 | Bareggi et al. | ................ | 73/1.09 |
| 5,911,154 A | * | 6/1999 | Hsieh | ............................ | 73/1.12 |
| 5,992,615 A | * | 11/1999 | Muchalov | ....................... | 198/831 |
| 6,609,407 B1 | * | 8/2003 | Tambini | ........................ | 73/1.11 |
| 6,865,958 B2 | * | 3/2005 | Herbold | .................... | 73/862.046 |
| 6,965,835 B2 | * | 11/2005 | McGee et al. | ................. | 702/41 |
| 7,088,557 B2 | * | 8/2006 | Miyamoto et al. | ......... | 360/265.2 |

(Continued)

FOREIGN PATENT DOCUMENTS

DE    299 02 272 U1   2/1999

(Continued)

*Primary Examiner* — David Rogers
(74) *Attorney, Agent, or Firm* — Lawrence G. Fridman (57) ABSTRACT

An operating device for testing torque wrenches is formed with a carrier for fixing a torque wrench to be tested. A transducer is coupled to the head portion of the torque wrench. A grip holder is provided for fixing the grip of the torque wrench and a deflecting mechanism is adapted for generating a torque to the head portion of the torque wrench to be tested. Further on a sliding mechanism is provided for sliding the grip in the grip holder without friction.

18 Claims, 10 Drawing Sheets

U.S. PATENT DOCUMENTS

| | | | |
|---|---|---|---|
| 7,594,446 B2 * | 9/2009 | Schwafertz | 73/862.325 |
| 7,647,808 B2 * | 1/2010 | Junkers | 73/1.12 |
| 7,757,540 B2 * | 7/2010 | Dabrowski | 73/1.12 |
| 7,885,780 B2 * | 2/2011 | Lucke | 702/108 |
| 2003/0056605 A1 * | 3/2003 | Chiapuzzi et al. | 73/862.21 |
| 2007/0068277 A1 * | 3/2007 | Hammond et al. | 73/856 |
| 2008/0223151 A1 * | 9/2008 | Lai | 73/862.08 |
| 2008/0271515 A1 * | 11/2008 | Dabrowski | 73/1.12 |

FOREIGN PATENT DOCUMENTS

| | | |
|---|---|---|
| DE | 20 2006 018 352 U1 | 12/2006 |
| JP | 03210447 A3 * | 9/1991 |

* cited by examiner

OPERATING DEVICE FOR TESTING TORQUE WRENCHES

FIELD OF THE INVENTION

The invention relates to testing equipment in general and specifically it relates to an operating device for testing torque wrenches.

BACKGROUND OF THE INVENTION

A torque wrench is used to exert a given torque on connecting elements, such as screws or nuts. For this purpose, torque wrenches comprise a wrench lever with a grip and a wrench head, referred to as head portion hereafter. Often, a coupling in the form of a square pilot is provided at the wrench head to receive an insert tool. Different insert tools for rotating screws or nuts can be fixed on the square pilot. A force exerted on the grip by a user in the operating direction is transferred from the wrench lever to the wrench head and generates a torque on a screw or nut through the insert tool. In order to measure the exerted torque the torque wrench is provided with a measuring device. With further devices the measured torque is continuously displayed or the reaching of a given torque is indicated.

The measuring device of the torque wrench is subjected to common wear and tear symptoms. The torque wrench must be calibrated from time to time with an operating device to check if a torque measured with the measuring device is the same as an exerted torque. For this purpose a carrier with a transducer and a grip holder is provided in the operating device. The head portion of the torque wrench is tightly coupled to the transducer, for example with the square pilot. The grip of the torque wrench is fixed by the grip holder.

Then a torque is exerted to the head portion of the torque wrench by a deflecting mechanism. This torque is measured by the transducer und displayed in a display provided at the operating device, for example at the transducer. The torque displayed by the torque wrench or a torque set for the torque wrench for a release can be tested by comparison with the torque displayed on the display.

With known operating devices for testing torque wrenches different deflecting mechanisms for the generation of a torque are used. In principal two ways are possible for the generation of a torque at the head portion of a torque wrench. The transducer is either rotatably fixed to the carrier and the grip holder is immoveable fixed to the carrier or, in the other way, the transducer is immoveable fixed to the carrier and the grip holder is moveably mounted on the carrier.

The operating devices having a grip holder which is moveable with respect to the carrier comprise a linear actuator with a spindle and a crank. By rotating the spindle by means of the crank the grip holder and thereby the grip of the torque wrench are deflected perpendicular to the carrier. Thereby a torque is exerted on the head portion which is fixed to the transducer. The torque wrench is tilted around an axis of the transducer. The grip is moved circularly in contrast to the linear movement of the grip holder and must, therefore, be held moveably in the grip holder.

The operating devices having a grip holder tightly mounted to an immovable carrier comprise a transducer rotatably fixed to the carrier with a deflecting lever or a gearing. The head portion of the torque wrench to be tested is tightly locked to the transducer by a transducer reception while the grip of the torque wrench is counter held by the grip holder. By application of a force on the deflection lever or by the rotary motion of the gearing a torque is exerted to the head portion via the transducer. In doing so the applied torque is measured by the transducer and compared with the torque displayed by the torque wrench or the torque predetermined at the torque wrench for a testing.

The grip holders of both kinds of operating devices comprise support surfaces which are made of steel or are coated with synthetic material. The torque wrenches to be tested usually have plastics grips and are provided with round or nearly round grips. During a measurement the grip in the grip holder is deflected horizontally. In doing so strong frictions of the grip surface on the support surface occur since a portion of the applied torque is used for overcoming the friction between the grip and the support. This leads to jerky motions during the deflection of torque wrenches and induces erroneous measurement results. In particular with very small torques to be tested severe distortion of measured values occurs being out of range of tolerance.

The known support devices for torque wrenches have the disadvantage of not being able to move the grip with little friction during a measurement. Instead they distort the measurement result because of abrupt motions of the torque wrench grips. This mainly occurs with torque wrenches having light grips since these are especially susceptible for lowest frictions at the support surface during the measurement. Torque wrenches comprising soft grips or grips with two components, for example with different plastics, also cause these undesirable and abrupt motions in the grip holder.

SUMMARY OF THE INVENTION

The invention relates to an operating device for testing torque wrenches comprising:
(a) a carrier for fixing a torque wrench to be tested,
(b) a transducer arranged at the carrier and coupled to the head portion of the torque wrench to be tested,
(c) a grip holder arranged at the carrier for fixing the grip of the torque wrench to be tested,
(d) a deflecting mechanism for generating a torque to the head portion of the torque wrench to be tested; and
(e) a sliding mechanism for sliding the grip in the grip holder without friction With the present invention calibrations of torque wrenches can be accomplished accurately. With the novel and inventive sliding mechanism the support surfaces in or at the grip holder for the grip of the torque wrench are provided in that way that disturbing friction does not occur during torque measurements. A torque wrench inserted in the operating device is as far as possible force-neutral with respect to occurring frictional forces when the grip is moving in the grip holder. The forces are at least calculable and ascertainable, so that this influence can be eliminated from a torque wrench measurement result. The grip holder for the grip of the torque wrench comprises a horizontal support surface and a vertical counterpart. At the beginning of the measurement the grip is guided in direction of the vertical counterpart. In doing so jerky motions of the grip affecting the test results can occur by operating devices according to prior art due to friction. Because of the sporadic appearance of this jerky motion the impact on test results cannot be eliminated without further ado. This impact is avoided as far as possible by the sliding mechanism according to the present invention. The friction forces affecting the grip are almost eliminated or are at least calculable and eliminable values by the novel and inventive mechanism. Thus even lowest torques to be tested can be calibrated accurately in particular with light torque wrenches. Heretofore measurements with light torque wrenches have been beyond the tolerance range regularly. With the present invention the calibration of torque wrenches can be accomplished reproducible, because no interfering and spontaneously occurring friction forces impact on the grips of the torque wrenches. It is self-evident that such kind of operating devices can also be used rotated in their alignment, for example 90° around.

Different deflection mechanisms for generating a torque are used with known operating devices testing torque wrenches. Basically two variants are possible for generating a torque at the head portion of a torque wrench. Either the transducer is rotatable mounted to the carrier and the grip holder is tightly coupled to the carrier or vice versa the transducer is tightly mounted to the carrier and the grip holder is moveably arranged at the carrier. Both kinds of operating devices can be provided with the sliding mechanism according to the present invention. In both variants jerky motions occurring during measurements are cancelled by the sliding mechanism according to the present invention so that even lowest testing torques can be tested accurately and securely.

Another aspect of the invention provides a horizontal sliding mechanism achieving a frictionless horizontal sliding of the grip in the grip holder all the way to the counterpart. At the operating devices the grips of torque wrenches are supported by a horizontal support. A torque wrench must be operated horizontally for an accurate test. The influences of the gravitational force or the material of the grip are eliminated by the horizontal sliding mechanism, in particularly for light and small torque wrenches during a testing process. The horizontal sliding mechanism prevents a lateral jerking occurring in direction of the counterpart when a torque is exerted to the torque wrench. With this measure an accurate measuring of the torque wrench is achievable.

During the measuring process, vertical forces between the grip and the counterpart in the grip holder emerge. These vertical forces can also affect the measuring process. Thus a further aspect of the present invention provides a vertical sliding mechanism for sliding the grip of the torque wrench in the grip holder or at the counterpart vertically without friction. At the operating devices the grips come into contact with the vertical counterpart of the grip holder during a measurement. In doing so lateral forces occur, which affect an accurate measurement. For example these forces are caused by flexible plastic grip sleeves of the torque wrenches. Such forces are reduced by the vertical sliding mechanism at the counterparts and the measurement of torque wrenches can be accomplished error free with regard to the friction. Furthermore the vertical sliding mechanism supports the usage of torque wrenches with different grip sizes for a frictionless calibrating of these torque wrenches.

Still another aspect of the present invention provides the sliding mechanism which comprises a sliding body adapted as a support and guided in or on a slide guiding. All torque wrenches to be tested bear on the sliding body with their grip. The sliding body moves on or in the slide guiding with equal friction. Thus each measurement can be accomplished similarly within the tolerance range. This measure according to the present invention enables a reproducible torque measurement of torque wrenches.

Still a further aspect of the present invention provides the sliding mechanism which comprises a ball or roller bearing allowing a sliding of the torque wrench grip with negligible friction during the measurement. Due to the sliding mechanism with a ball or roller bearing the grip of the torque wrench moves uniformly and without friction in the operating device during the measurement. The sliding of the torque wrench takes place directly or indirectly via the ball or roller bearing. With direct ball or roller bearing this bearing serves as support or contact surface for the grip sliding over them. With the indirect bearing for example a sliding body designed as support or contact surface slides over the corresponding support area using the ball or roller bearing. Due to the almost frictionless motion of the ball or roller bearing an accurate and quick calibration of torque wrenches is particular facile with this advantageous modification.

Another aspect of the present invention discloses the sliding body which is sleeve-like and encloses a slide guiding formed as a pin. The sleeve provides the support surface or contact surface for the grip of the torque wrench. The sleeve always moves with equal friction upon the pin. Thus friction forces at the transducer are kept constant during a testing process. By means of the sleeve measurement errors caused by jerky motions of the grip on a rigged support surface are compensated as far as possible. For this purpose the accordingly adapted sleeve slides on the pin. The sleeve can be designed in that way that it is supported by the pin with balls or rollers. The test of a torque wrench is optimized by this modification.

A further aspect of the present invention provides a skid-like sliding body, wherein the slide guiding is formed by a respective guiding surface. This modification is considered to be an alternative to the sleeve. However, both described modifications can also be used in combination. The sliding body designed as skid has the advantage that measurements of torque wrenches can be accomplished expeditiously and in an uncomplicated way. During the measurement the torque wrenches bear upon the skid-like sliding body which in turn moves nearly frictionless upon a guiding surface. The skid-like sliding body is easily producible. Conventional operating devices can be upgraded with the skid-like sliding body, if necessary. The upgrading can be accomplished in short time and with minimal effort. Due to the sliding of the skid in or on the guiding surface this kind of modification is notable service reduced and the testing of torque wrenches is accomplished in an optimal way. For example the skid-like sliding body can be provided with balls or rollers with which it is movable with low friction.

Still another aspect of the invention provides the deflecting mechanism with a device for deflecting the torque wrench. With this measure a torque wrench to be tested and inserted into the operating device is operated. A torque is generated at the head portion and measured by the transducer of the operating device. In doing so the torque wrench pivots around the axis at the head portion. In numerous operation devices the grip of the torque wrench moves circularly while in contrary the grip holder fulfils a linear movement. The grip has to be hold loose and movable within the grip holder because of the different kinds of motion. The movement of the torque wrench grips around the fixed torque wrench head can be accomplished with especial low friction by the sliding mechanism. Occurring lateral forces distorting the measurement results are eliminated as far as possible by the sliding mechanism and the achieved measurement results are accurate and reproducible.

According to still a further aspect of the invention the deflecting mechanism comprises a deflecting lever acting on the head portion of the torque wrench to be tested, and the carrier is immobile with respect to the deflecting lever. The head portion of the torque wrench to be tested is tightly locked by means of the reception of the transducer while the grip of the torque wrench is counter held by the grip holder. A torque is exerted on the head portion through the transducer by the application of a force on the deflecting lever. The exerted torque is measured by the transducer and compared to the torque displayed by the torque wrench or to the torque set at the torque wrench for testing.

Since the grip holder is not moved during a testing procedure the origin of force at the grip and the point of application, respectively, does not change during the entire testing. Hence a measurement is possible with unvaried lever length. Furthermore no gearing or mechanism for tilting the entire carrier is needed due to the use of a deflecting lever. An assembly of the operating device for testing torque wrenches is carried out compact and flatly and with only a few individual components. Furthermore the assembly can be produced with little costs and is less accident-sensitive because of the small amount of individual components.

With the sliding mechanism according to the invention it now is possible to accomplish torque measurements frictionless with operating devices in which the torque wrench is tightly connected to the carrier. The friction occurring between the grip of the torque wrench and the support surface of the grip holder is almost completely avoided by the sliding mechanism. The jerky motions of the torque wrench appearing heretofore during the measurement are prevented effectively by this kind of operating device so that the measurement results are accurate and repeatable.

According to still another aspect of the invention comprises a spindle device arranged at the carrier. A driver arranged on a spindle of the spindle device deflects the deflecting lever or the torque wrench upon operation of the rotatably supported spindle. Thereby a driver arranged on the spindle of the spindle device deflects the deflection lever upon operation of the rotatably supported spindle. Due to the gear reduction of the crank and the spindle an even tightening and a fine adjustment of the torque is possible with a minimum of power by the user. Due to the use of only a small amount of moveable parts the operating device can be realized very flatly and compact. It only requires little work space, is little accident-sensitive and needs less maintenance because of the small amount of moveable parts.

In an advantageous modification of the operating device according to the invention the spindle of the spindle device is adapted to be driven by a motor, such as an electromotor. The use of a motor frees the user of the use of a crank and thereby avoids the exhaustion of the user. The user can better concentrate on the testing procedure. Measuring errors due to inattention of the user, such as different tightening speeds, are avoided. Measuring procedures can be easily automated with a suitable motor control.

According to a further advantageous modification according to a further aspect of the invention an adjustably arranged grip holder is provided on the carrier of the operating device, being adjustable in the longitudinal direction of the torque wrench to be fixed. Thus the grip holder can be adjusted to different torque wrenches having a different length. The operating device can be adapted to torque wrenches having different sizes without much effort. It is ensured, that the origin of force and the point of application, respectively, are always in the middle of the grip.

According to further modification of the invention, a signal processing unit is comprised which processes the measured signals of the transducer, especially digitizes, stores in a storage and displays them on a display. For example a processing of measured signals enables a consideration of systematic measurement errors during a test. Digitized measured values can be easier processed, displayed and stored. A fine adjustment of the torque for precise testing of a torque wrench can be carried out by the user by continuously displaying exerted torques by means of a display. Storing of measured torque values facilitates the recording of a test procedure for the user and enables the archiving of test procedures with the torques exerted at the head portion of a torque wrench. Releasing torque wrenches can be better tested by storing the maximum exerted torque before it releases.

As to still another aspect of the invention the carrier is extendable. The operating device is also suitable for testing very long torque wrenches due to an extended carrier. When small torque wrenches are tested the device can be set up with small dimensions and therefore requires less work space. Furthermore the transport of the operating device is facilitated by a corresponding shortening of the carrier and the accompanied saving of space.

Further modifications and advantages become apparent from the subject matter of the subclaims as well as the drawings with the corresponding description. An example is described below in greater detail with reference to the accompanying drawings.

DESCRIPTION OF THE EMBODIMENTS OF THE INVENTION

Figure 1:
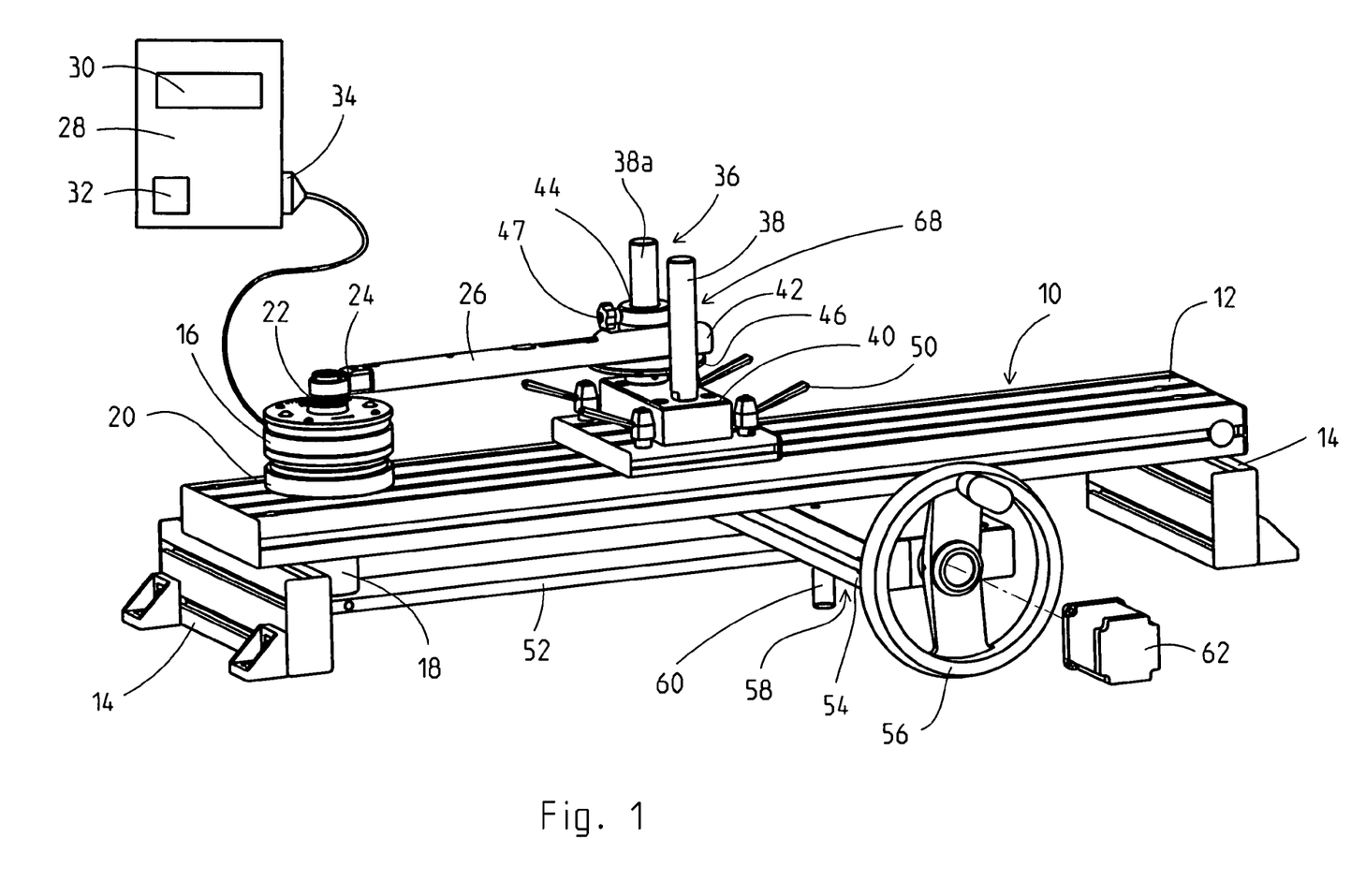
FIG. 1 shows a schematic principle diagram of an embodiment of an operating device for testing torque wrenches having a deflection lever.

Referring to FIG. 1 a first exemplary embodiment of an operating device 10 for testing torque wrenches 26 is shown, comprising a deflecting mechanism provided as deflection lever 52 exerting a force to a head portion 24 of the torque wrench 26. A grip holder 36 tightly connected to a carrier 12 is provided with a sliding mechanism 68.

The operating device 10 comprises the carrier 12 with two pedestals 14 which may be adjustable in height. They ensure a safe and horizontal stand of the operating device 10 and can be screwed to a basis. A transducer 16 is rotatably mounted to the carrier 12. For this purpose the transducer 16 is provided with a rotatable pin 18 which is guided through a recess in the carrier 12 and which is rotatably held at the carrier 12 in a bearing 20. Furthermore a reception 22 is provided at the transducer 16. With the reception 22 the head portion 24 of the torque wrench 26 is tightly coupled to the transducer 16 via a squared pilot. Alternatively receptions 22 can be selected for different tools fixed at the head portion 24. The grip holder 36 tightly mounted to the carrier 12 comprises two pins 38, 38a which are arranged in u-shape over a bridge 40. Depending on the rotating direction to be tested one of the pins 38 or 38a serves as a counterpart for a grip 42 of the torque wrench 26.

In an alternative embodiment the grip holder 36 comprises a changeable pin 38 and the bridge 40 comprises two receptions for the pin 38. Depending on the rotation direction the changeable pin 38 is guided to the corresponding reception and forms a counterpart counter holding the grip 42. A sleeve 44 surrounds the pin 38. The sleeve 44 is sliding on the pin 38. This forms the vertical part of the sliding mechanism 68 to minimize vertical lateral forces between the grip 42 and the pins 38, 38a. The horizontal sliding mechanism 68 is arranged between the pins 38, 38a to avoided horizontal friction. Different embodiments of the sliding mechanism 68 can be used. The sliding mechanism 68 can be provided as ball—or roller bearing 80, as sliding sleeve 82 or for example in the form of a guiding bar 70.

The bridge 40 is locked with releasable locking means 50, such as, for example, manually operated clamping levers, at the carrier 12. By releasing the locking means 50 the entire grip holder 36 can be shifted on the carrier 12 and can be adapted to the length of a torque wrench 26 in such a way. The carrier 12 is extendable in order to be able to also test very long torque wrenches 26 with the operating device 10, if necessary.

One end of the deflecting lever 52 is fixed to the rotating pin 18 projecting at the bottom of the carrier 10 to generate a torque. A torque is exerted on the head portion 24 of the torque wrench 26 via the rotating pin 18 and the transducer 16 by deflecting the deflecting lever 52. A spindle device 54 is arranged on the carrier 12 to deflect the deflection lever 52. A rotatably supported spindle 58 is operated with a crank 56 by the user. The spindle 58 drives a driver 60 which is moveably connected to the other end of the deflecting lever 52 and deflects it. For this purpose the driver 60 is provided, for example, with a pin in an elongated hole in the deflecting lever 52 or with two pins and the end of the deflecting lever 52 being arranged there between.

Different linear drivers can be provided to operate the deflecting lever 52 instead of the spindle device 54. In a further embodiment of the operating device 10 a motor 62, such as an electromotor is used instead of the crank 56 for manually operating the spindle device 54.

Torque values measured by the transducer 16 are transmitted to a signal processing unit 28 where they are processed and digitized. Afterwards the measured torque values are displayed on a display 30 and stored in a storage 32 for recording and archiving. Measured values can be transmitted to external devices for further processing through an interface 34.

For testing the torque wrench 26 with the operating device 10 a sleeve 44 provided with the sliding mechanism 68 is shifted on the corresponding pin 38 or 38a depending on the rotational direction to be tested. Then the head portion 24 of the torque wrench 26 is coupled to the recess 22 of the transducer 16. After releasing the locking means 50 the grip holder 36 is shifted on the carrier 12 and afterwards locked again to let the pin 38a with the sleeve 44 counteract the grip 42 of the torque wrench 26 in the middle. In doing so the grip 42 of the torque wrench 26 come to rest upon the sliding mechanism 68. The sleeve 44 provided with the sliding mechanism 68 is aligned in height by exerting a small torque and is fixed with a clamping screw 47 in such a way that an support surface 46 equipped with the frictionless sliding mechanism 68 supports the bottom of the grip 42 and holds it perpendicular to the axis of the transducer 16.

After these preparations the real testing of the torque wrench 26 is carried out. By operating the crank 56 or the motor 62 the user exerts an evenly and very accurately adjustable torque on the head portion 24 of the torque wrench 26 through the spindle device 54, the deflecting lever 52, the rotating pin 18 and the transducer 16. Because of the force of the torque the torque wrench 26 slides without friction on the sliding mechanism 68 and comes into vertical contact to the pin 38. The otherwise occurring lateral forces are annihilated by the vertical sliding mechanism 68, which is, for example, provided as sleeves 44. The exerted torque is measured by the transducer 16 and displayed on the display 30 after processing by the signal processing unit 28.

The user can compare the exerted torque to the torque displayed on the torque wrench 26 and store it in the storage 32 if necessary at all times. For releasing torque wrenches 26 the maximum exerted torque is automatically stored in the storage 32. This facilitates the comparison between the torque set at the torque wrench 26 and the torque exerted in the moment of the release.

Afterwards the torque wrench 26 is calibrated and the testing is repeated until a coincidence of the torque values is reached within given tolerance thresholds. The torque values stored in the storage 32 can be transmitted to external devices, such as a printer, through an interface in order to print them or to archive a testing protocol.

Figure 2:
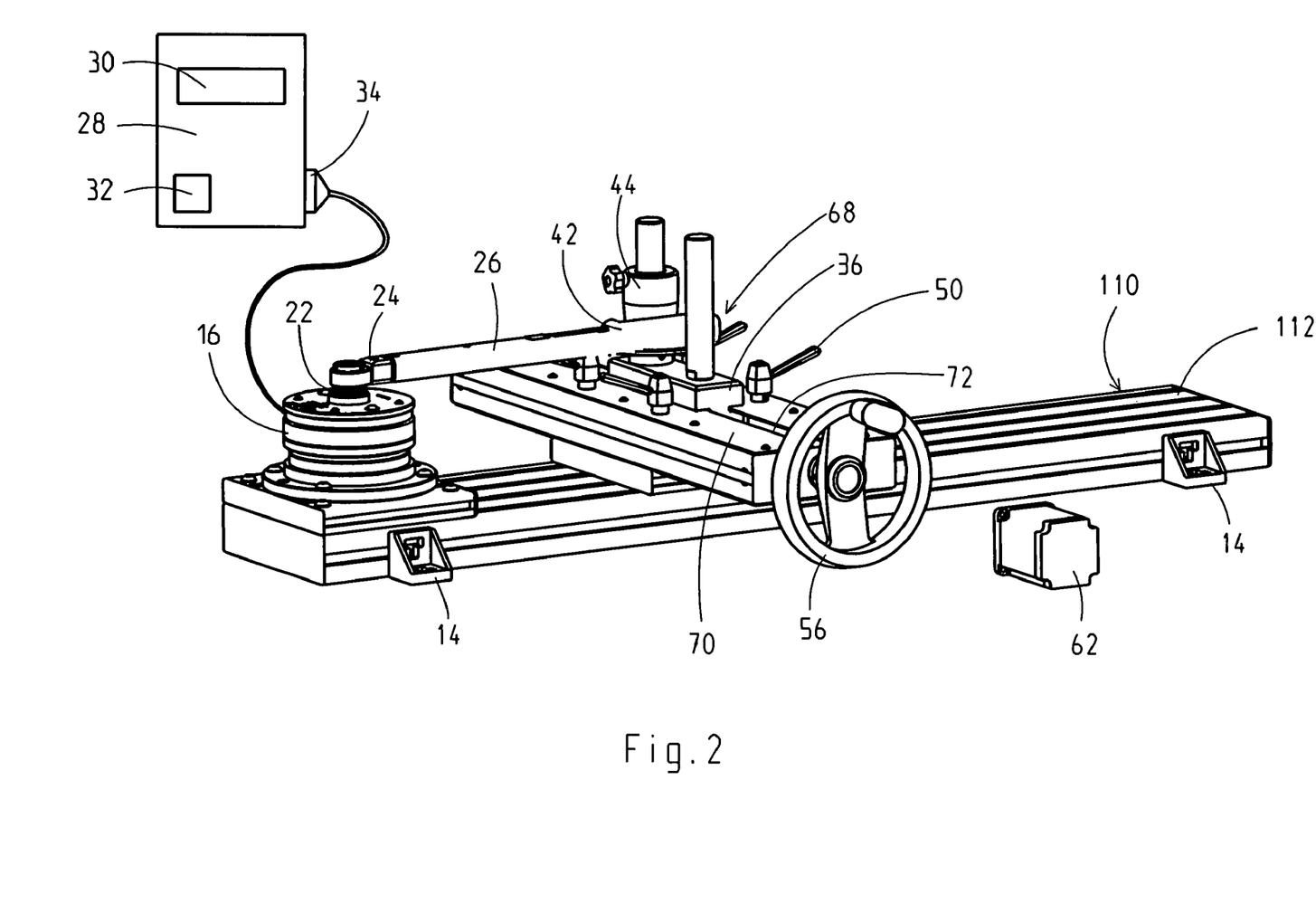
FIG. 2 shows a schematic principle diagram of an embodiment of an operating device for testing torque wrenches having a movable guiding bar.

FIG. 2 shows a further exemplary embodiment of an operating device 110 for testing torque wrenches 26. In contrast to FIG. 1 the deflecting mechanism consists of a guiding bar 70 with movable grip holder 36. The force of the exerted torque moves the grip 42 of the torque wrench 26 within a guiding bar 70 in lateral direction to a carrier 112. The head portion 24 of the torque wrench 26 is arranged in the transducer 16, which in turn is tightly connected to the carrier 112. The sliding mechanism 68 is arranged at the grip holder 36 in horizontal and vertical alignment.

The operating device 110 comprises the carrier 112 with two pedestals 14 which may be adjustable in height. They ensure a safe and horizontal stand of the operating device 110 and can be screwed to a basis. The guiding bar 70 is arranged on the carrier 70 and provided with a groove 72 in which the free movable grip holder 36 is located. The sliding mechanism 68 is mounted in horizontal and vertical direction within the grip holder 36. Furthermore the transducer 16 is tightly mounted to the carrier 112. The head of the torque wrench 26 is tightly coupled to the transducer 16 through a reception 22 and a four cornered pin.

The guiding bar 70 is arrested to the carrier 112 with releasable locking means 50, for example manually operable clamping levers. By releasing the locking means 50 the guiding bar 70 can be shifted on the carrier 112 and be adjusted to the size of the torque wrench 26 in this way. The carrier 112 is extendable in order to be able to also test very long torque wrenches 26 with the operating device 110, if necessary.

Torque values measured by the transducer 16 are transmitted to the signal processing unit 28 where they are processed and digitized. Afterwards the measured torque values are displayed on the display 30 and stored in the storage 32 for recording and archiving. Measured values can be transmitted to external devices for further processing through the interface 34.

For testing the torque wrench 26 with the operating device 110 at first the head portion 24 of the torque wrench 26 is coupled to the recess 22 of the transducer 16. The guiding bar 70 is moved upon the carrier 112 according to the length of the torque wrench 26 and the grip 42 of the torque wrench 26 is inserted loosely in the grip holder 36 into the sliding mechanism 68.

The testing of the torque wrench 26 is carried out by operating the crank 56 or the motor 62. The thereby emerging force affects a shift of the grip holder 36 within the guiding bar 70. In doing so the torque wrench 26 is pivoted around the axis of the transducer 16. In contrary to the linear motion of the grip holder 36 the grip 42 moves circularly around the transducer 16 and therefore has to be held movably by the grip holder 36. With the sliding mechanism 68 extending between the pins 38, 38a in horizontal and vertical alignment the motion of the grip 42 in direction of the pins 38, 38a can take place almost frictionless. The force applied by the crank 56 generates a torque to the head portion 24 fixed at the transducer 16. Simultaneously the exerted torque is measured by the transducer 16 and displayed on the display 30 after a processing by the signal processing unit 28.

Figure 3:
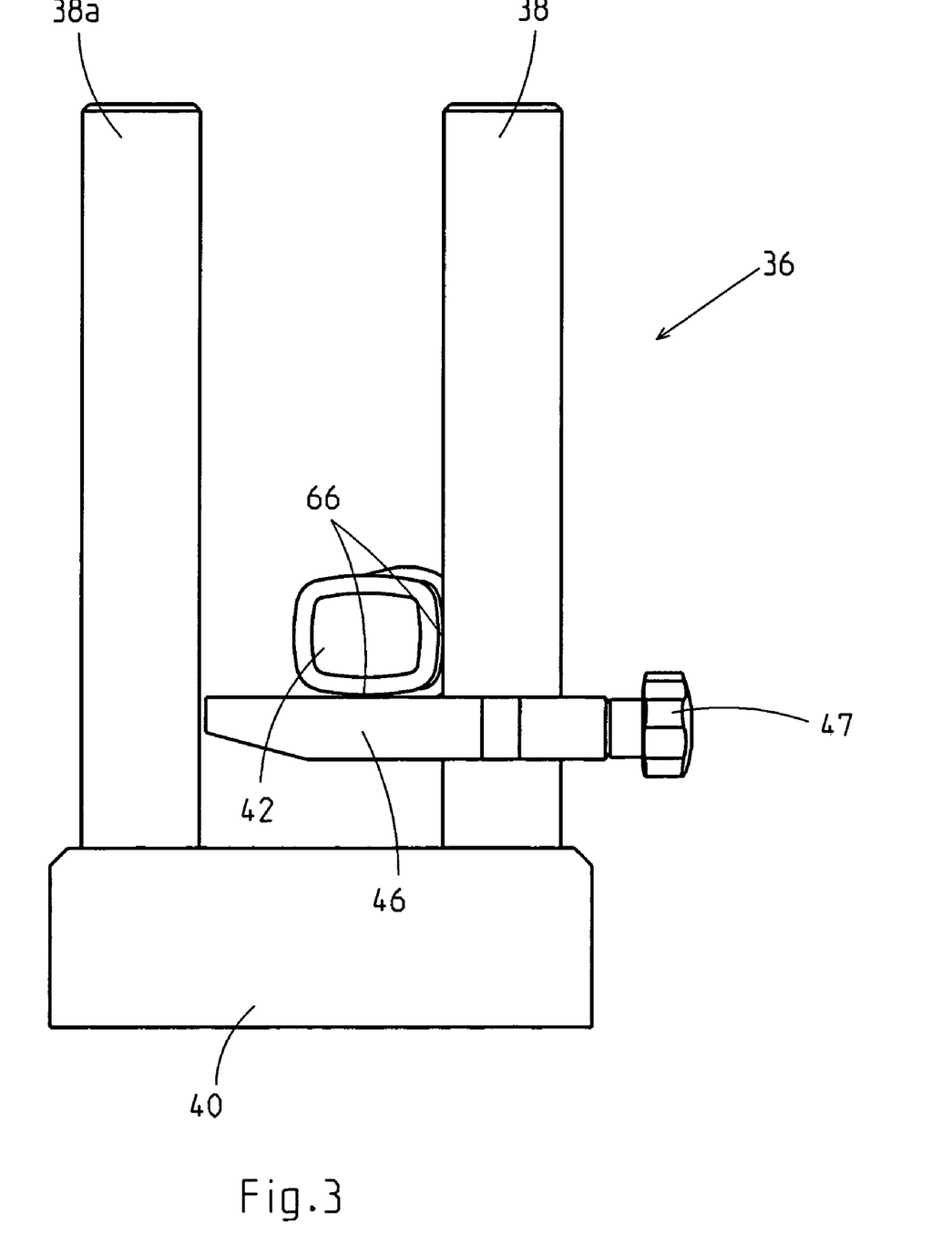
FIG. 3 shows a detailed view of a grip holder according to prior art.

FIG. 3 shows a first detailed view of the grip holder 36 used with operating devices 10, 110 as described above. The transducer 16 is mounted to the carrier 12, 112 and the grip holder 36 is coupled either tightly (FIG. 1) or on the guiding bar 70 movable (FIG. 2) to the carrier 12, 112. The support 46 of the grip holder 36 usually is made of sheet steal. In doing so the grip 42 of the torque wrench 26 bears loosely on the support surface 46 between the pins 38, 38a. During a measurement the torque wrench 26 receives a torque at the grip 42. Thereby small jerky motions of the grip 42 can lead to incorrect measurements. In particularly soft plastic areas 66 provided by most grips 42 of torque wrenches 26 have a strong adhesion to the support surface 46 and enforce the jerky motions of the grips 42 during measurement. The jerky motions occur sporadically and can influence the measurement significantly. The repeatability of the results is not ensured with these grip supports. In particularly this applies for very small torques to be tested so that results for torque wrenches 26 are already beyond required accuracy because of the friction of grip 42 and support 46.

Figure 4:
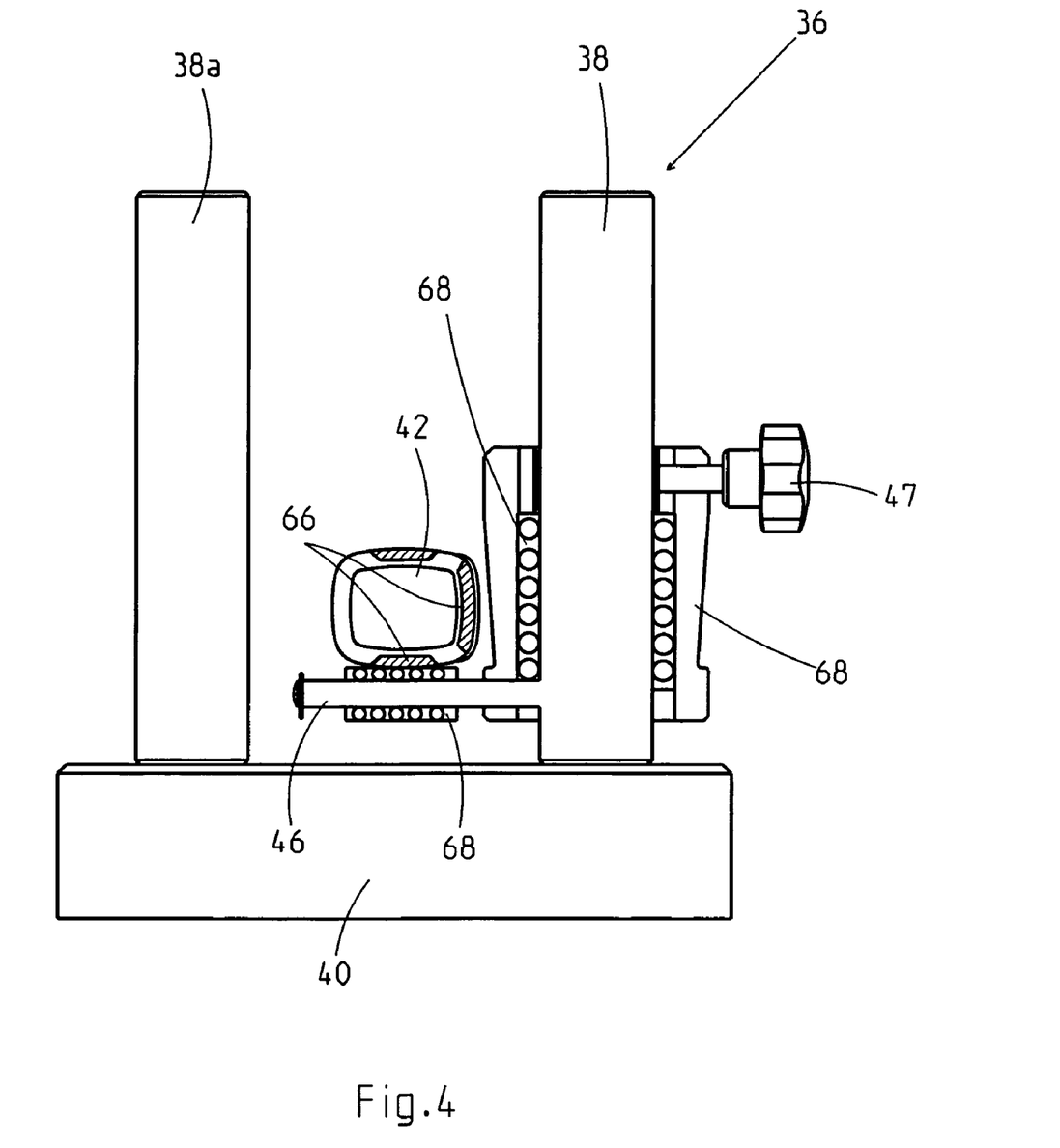
FIG. 4 shows a detailed view of a grip holder comprising an exemplary sliding mechanism according to the invention.

FIG. 4 shows a detailed view of the grip holder 36 comprising an exemplary sliding mechanism 68 according to the invention. The grip 42 of the torque wrench 26 often comprises soft plastic areas 66 and bears loosely on the low-friction sliding mechanism 68. The sliding mechanism 68 extends horizontally between the pins 38 and 38a as well as vertically at the pins 38, 38a. The sliding mechanism 68 can be provided in different specifications. Either it comprises a sliding body guided by a guiding bar or a ball or roller bearing ensuring a sliding of the grips 42 with negligible friction. Furthermore sliding sleeves or sliding bars are conceivable on which the torque wrench grips 42 can move with low friction during a measurement. During a measurement with the operating device 10, 110 the grip 42 of the torque wrench 26 receives a force in direction of the pins 38, 38a. Due to the loose bearing of the torque wrench grips 42 jerky motions occur during the measurement using conventional operating devices not provided with a sliding mechanism. The jerky motions are eliminated by the novel sliding mechanism 36. The calibration of the torque wrench 26 can be accomplished accurately.

Figure 5:
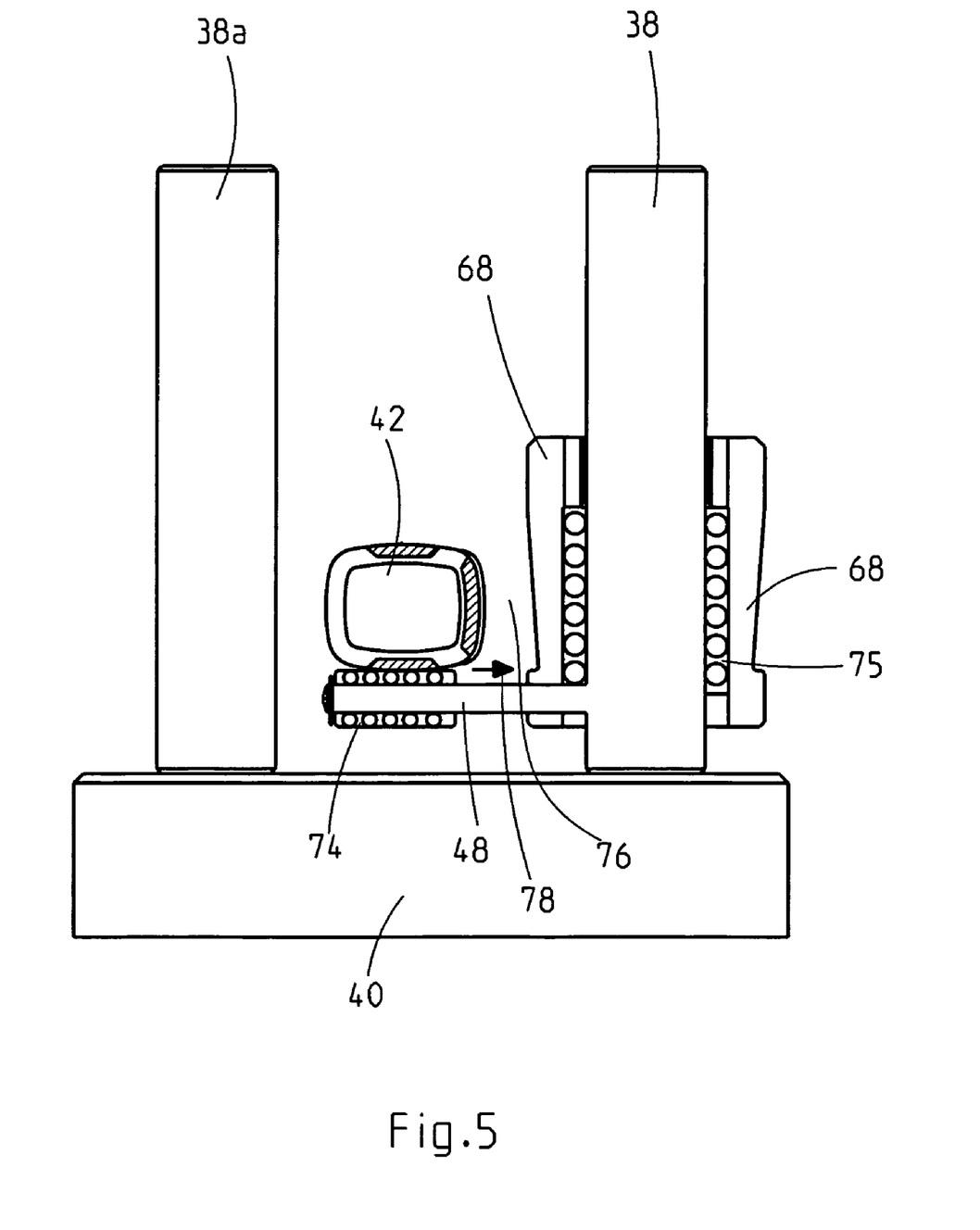
FIG. 5 shows a detailed view of a grip holder during the measurement process.
Figure 5A:
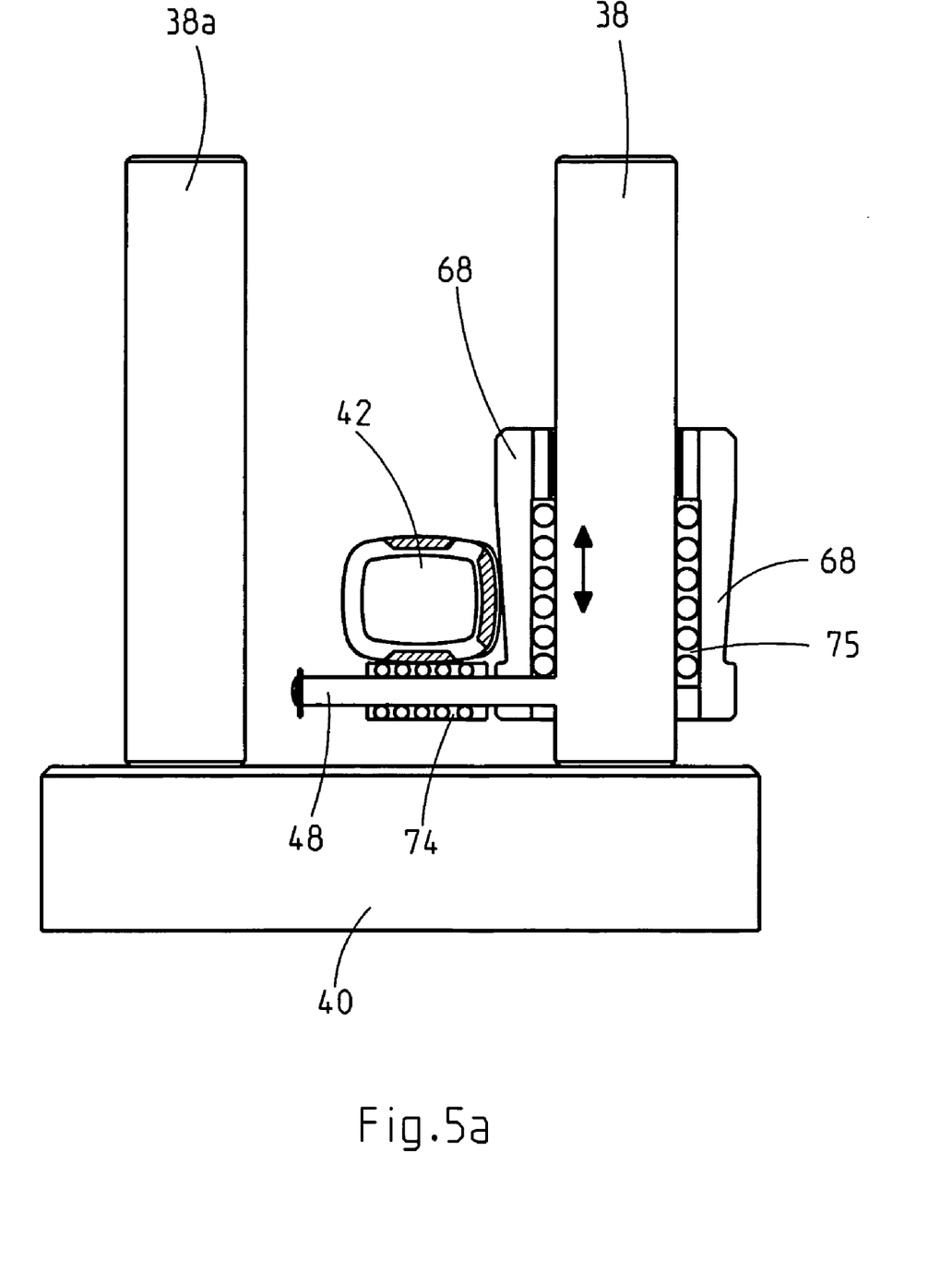
FIG. 5a shows a second detailed view of a grip holder during the measurement process.

FIG. 5 and FIG. 5a show an exemplary embodiment of the grip holder 36 with a sliding mechanism 68 in a detailed view (back view). The sliding mechanism 68 is shown in form of a ball bushing extending between the pins 38, 38a in horizontal and vertical alignment. FIG. 5 shows the bearing of the grip 42 in the grip holder 36 at the beginning of the measurement. The grip holder 36 comprises a horizontal pin 48 and the two pins 38, 38a arranged at the ends of pin 48. The pin 48 provides a sleeve 74 being the support surface for the grip 42 in the grip holder 36. A further sleeve 75 encloses the pins 38, 38a and allows a vertical height compensation of the torque wrench 26. This is important for avoiding lateral forces at the transducer 16 and measurement errors caused thereby. Again the pins 38 and 38a are the counterpart for the grip 42 in the grip holder 36. A gap 76 between the grip 42 and the pin 38 is clearly shown. During the measurement the grip 42 of the torque wrench 26, for example, is moved towards pin 38, arrow 78. Friction forces occurring thereby are annihilated by the as far as possible frictionless sliding sleeve 74. The operating devices not provided with a sliding mechanism present jerky motions during a measurement distorting the result. The sliding mechanism 68 according to the invention allows a frictionless sliding of the grips upon the support, so that accurate measurements are achievable for the torque wrenches 26.

Figure 5B:
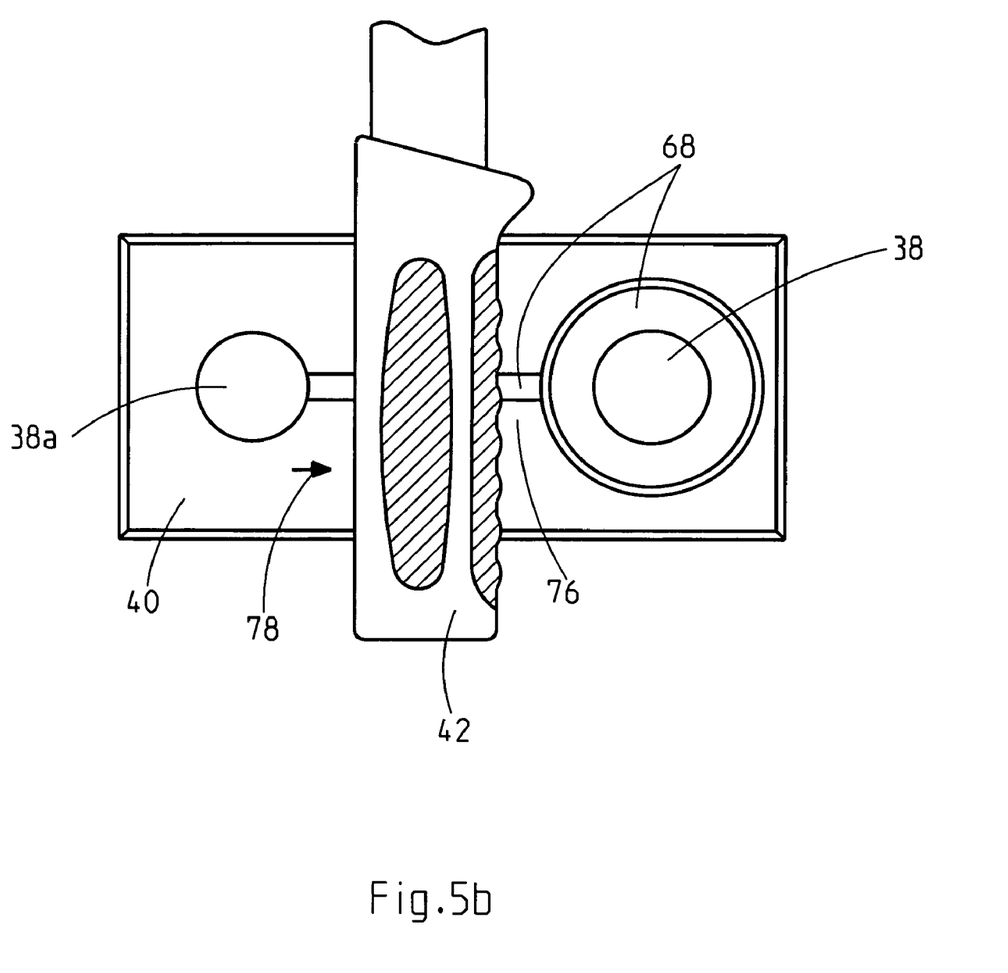
FIG. 5b shows a third detailed view of a grip holder during the measurement process.

FIG. 5b shows a detailed top view of the grip holder 36. A gap 76 is clearly shown between the grip 42 and the pin 38 or 38a. A sliding mechanism 68 according to the invention comprises the support surface 46 as well as the pins 38, 38a. During testing the torque wrench 26 the gap 76 between the torque wrench grip 42 and the pin 38, 38a has to be overcome with lowest possible friction. This is ensured by the sliding mechanism 68. The sliding mechanism 68 can be provided in form of ball or roller bearings 80, a skid-like sliding bar 84 or a sleeve-like sliding body 82. Depending on the modification of the operating devices 10, 110 a combination of said embodiments is also possible.

Figure 6:
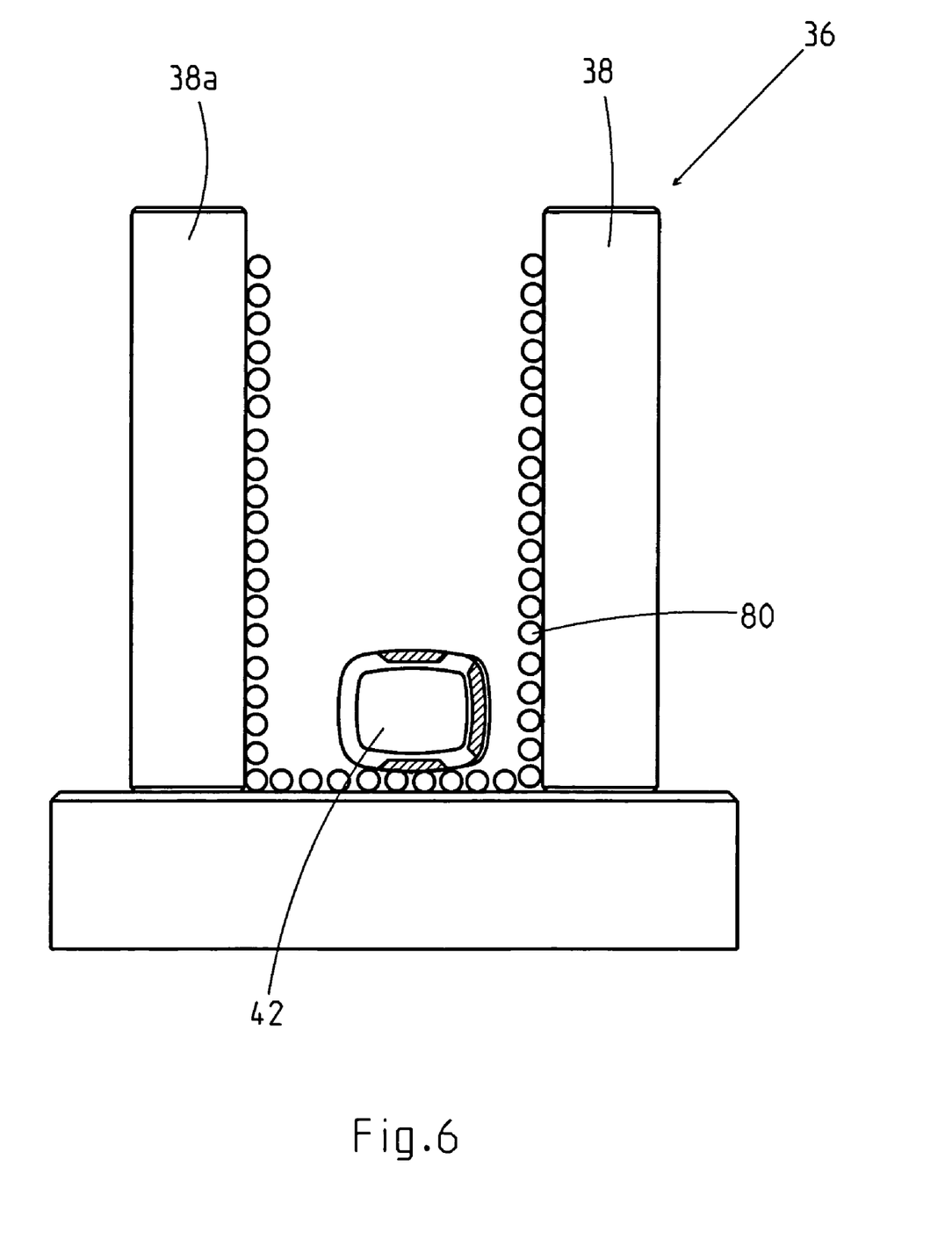
FIG. 6 shows a detailed view of a grip holder comprising a sliding mechanism designed in form of a ball or roller bearing.

FIG. 6 shows a detailed view of an embodiment of the sliding mechanism 68 provided in form of a ball or roller bearing 80 coating the grip holder 36 horizontally as well as vertically. The grip 42 of the torque wrench 26 bears loosely upon the ball or roller bearing 80 and is movable free and frictionless during the torque measurement. Lateral forces occurring with conventional grip holders without sliding mechanism are prevented by this embodiment.

Figure 7:
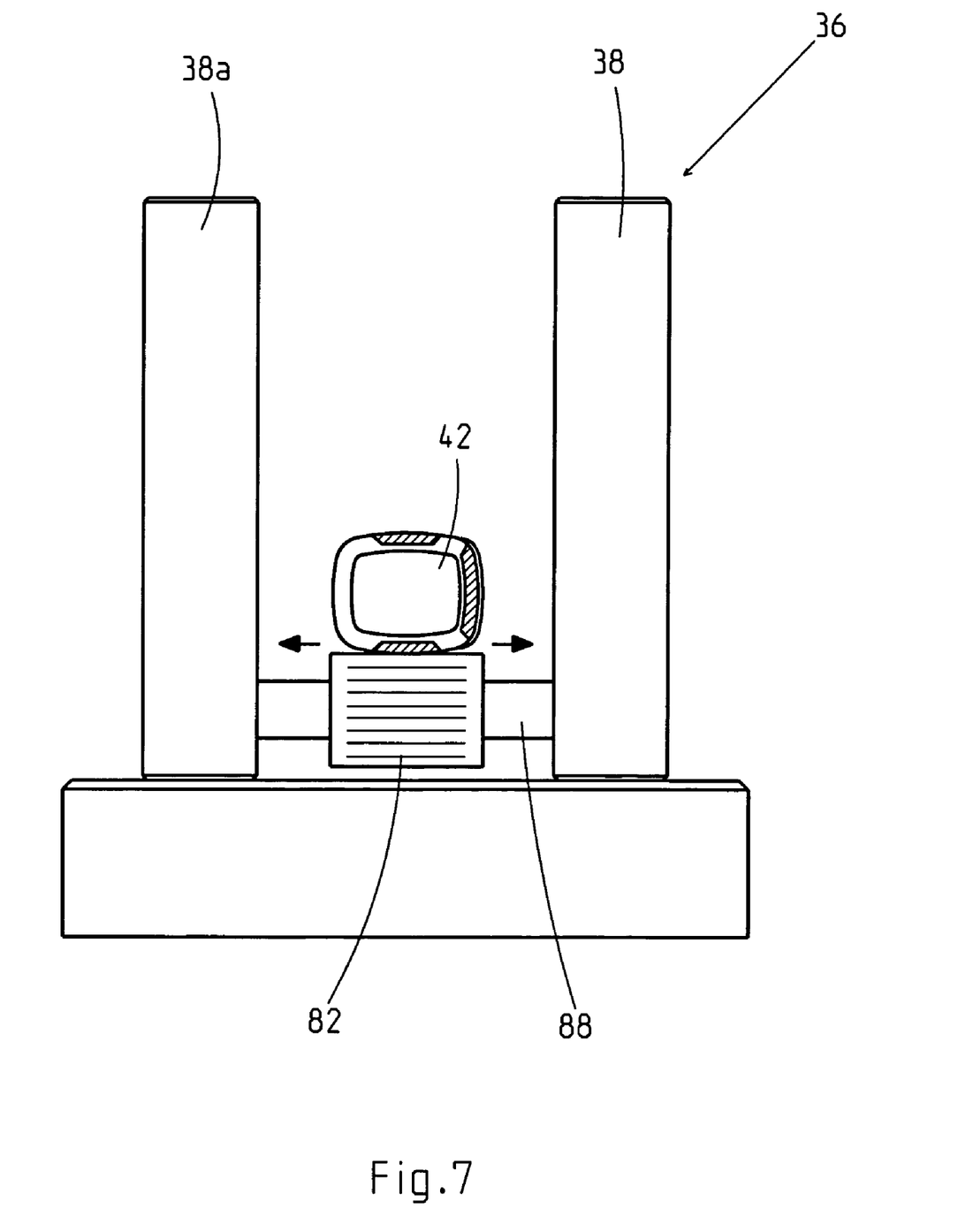
FIG. 7 shows a detailed view of a grip holder comprising a sliding mechanism designed in form of a sleeve.

FIG. 7 shows a detailed view of an embodiment of the sliding mechanism 68 provided in form of a sliding sleeve 82 enclosing a guiding surface 88 provided as slide guiding. The sleeve 82 sets up the support surface for the grip 42 of the torque wrench 26 and can be designed to move upon the guiding surface 88 using a particular effective lubricant, for example a lubricating grease. The sleeve 82 always moves with equal friction upon the guiding surface 88. Thus friction forces at the transducer 16 are kept constant during a test process. By means of the sleeve 82 the present embodiment as far as possible compensates measurement errors which are caused by jerky motions of the grip upon a rigid support surface. The testing of a torque wrench 26 is optimized by this embodiment.

Figure 8:
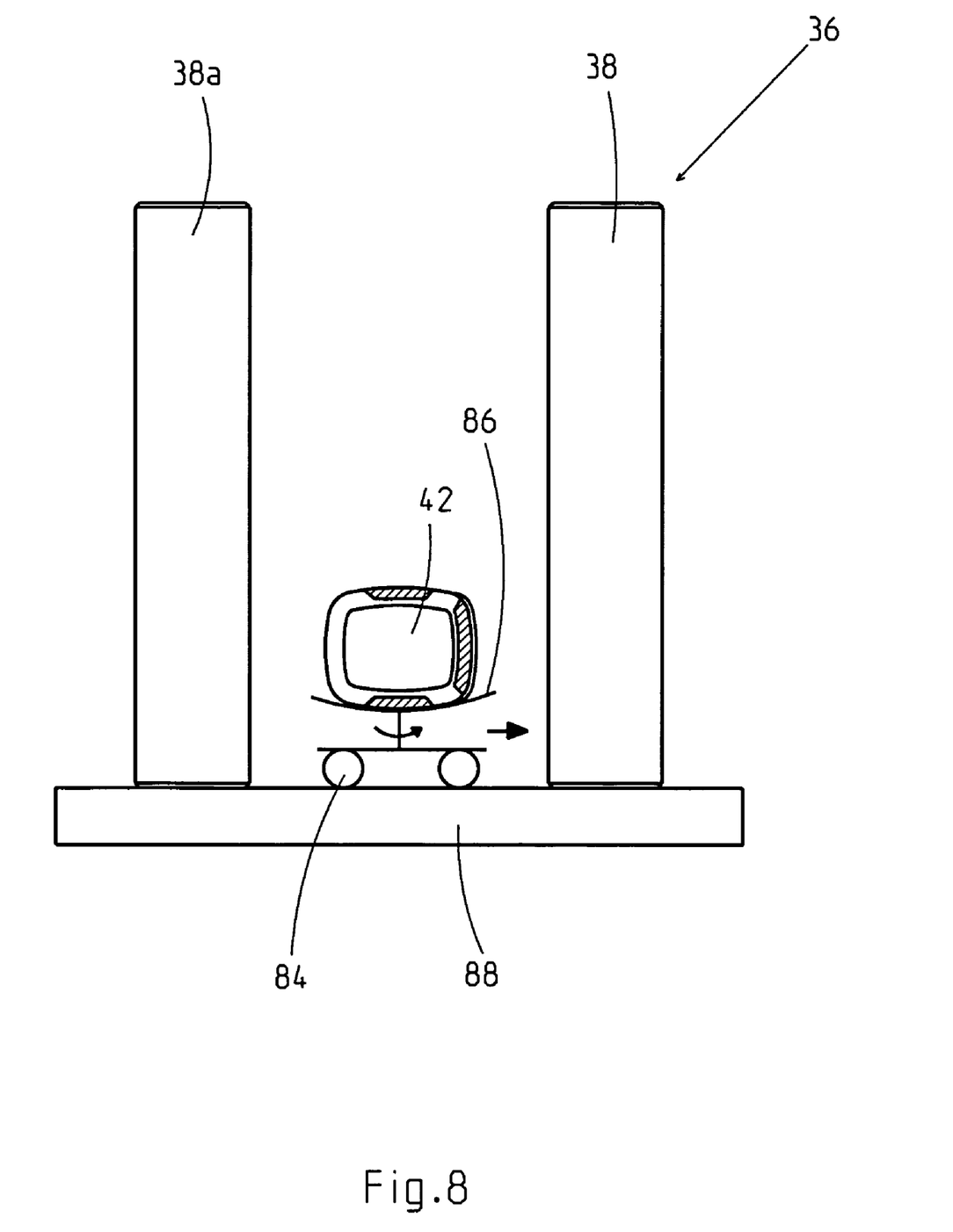
FIG. 8 shows a detailed view of a grip holder comprising a sliding mechanism designed in form of a skid.

FIG. 8 shows a detailed view of an embodiment of the sliding mechanism 68 provided in form of a sliding skid 84, which is bedded on a guiding surface 88 and provided with a freely rotatable saucer-shaped support surface 86. At the beginning of a measurement the grip 42 of the torque wrench is fixed at the saucer 86 which is free movable with respect to the sliding skid 84. This ensures an accurate alignment of the grip 42 to the transducer 16. During the measurement the sliding skid 84 slides with low friction within the corresponding guiding surface 88. For example the sliding skid 84 can be provided with balls or rollers with which it is low-friction movable. The sliding skid 84 can be applied practical to every support surface 46 of any grip holder 36 and, in this modification, is particular suitable for upgrading conventional operating devices.

What is claimed is:

1. An operating device for testing torque wrenches with a head portion and a grip extending in a longitudinal direction, the operating device comprising:
a carrier for fixing a torque wrench to be tested,
a transducer adapted to accommodate said head portion of said torque wrench to be tested coupled thereto, said transducer adapted to generate measured signals,
a grip holder for fixing said grip, the grip holder comprising at least one support surface for supporting the grip,
a deflecting mechanism for generating a torque to said head portion, and
a sliding mechanism provided between said support surface and said grip holder for sliding said grip together with the support surface in said grip holder with minimized friction to avoid abrupt movement of the torque wrench grip during testing.

2. An operating device according to claim 1, comprising a horizontal sliding mechanism for sliding of said grip in said grip holder with the minimized friction to avoid abrupt movement of the torque wrench grip in a substantially horizontal direction.

3. An operating device according to claim 1, comprising a vertical sliding mechanism for sliding of said grip in said grip holder with the minimized friction to avoid abrupt movement of the torque wrench grip in a substantially vertical direction.

4. An operating device according to claim 1, wherein said sliding mechanism is provided with a roller bearing.

5. An operating device according to claim 1, wherein said deflecting mechanism is provided with a device for deflecting said torque wrench.

6. An operating device according to claim 1, wherein said deflecting mechanism comprises a deflecting lever acting on said head portion of said torque wrench to be tested, and said carrier is immobile with respect to said deflecting lever.

7. An operating device according to claim 1, wherein said grip holder is arranged on said carrier adjustable in the longitudinal direction of said torque wrench to be fixed for torque wrenches having a different length.

8. An operating device according to claim 1, wherein said sliding mechanism is provided with a sliding body adapted as a support, which is guided in or on a slide guiding.

9. An operating device according to claim 8, wherein said sliding body is sleeve-like and said slide guiding is formed as a pin and said sleeve-like sliding body encloses said pin.

10. An operating device according to claim 8, wherein said sliding body is formed having a skid-like configuration and said slide guiding is formed by a respective guiding surface.

11. An operating device according to claim 1, further comprising a spindle device arranged at said carrier, wherein a driver arranged on a spindle of said spindle device deflects said deflecting lever or said torque wrench upon operation of the rotatably supported spindle.

12. An operating device according to claim 11, wherein said spindle of said spindle device is adapted for driving by a motor.

13. An operating device according to claim 12, wherein said motor is an electrical motor.

14. An operating device according to claim 1, further comprising a signal processing unit, which processes said measured signals of said transducer.

15. An operating device according to claim 14, wherein said signal processing unit digitizes, stores in a storage and displays on a display said measured signals.

16. An operating device according to claim 1, wherein said carrier is extendable.

17. An operating device for testing torque wrenches with a head portion and a grip extending in a longitudinal direction, the operating device comprising:
a carrier for fixing a torque wrench to be tested,
a transducer adapted to have said head portion of said torque wrench to be tested coupled thereto, said transducer adapted to generate measured signals,
a grip holder for fixing said grip,
a deflecting mechanism for generating a torque to said head portion, and
a sliding mechanism formed with a roller bearing for sliding said grip within said grip holder with minimized friction to avoid abrupt movement of the torque wrench grip during testing.

18. An operating device according to claim 17, wherein said roller bearing is a ball bearing.

* * * * *